(12) United States Patent
McMurphy

(10) Patent No.: US 9,982,451 B2
(45) Date of Patent: May 29, 2018

(54) HOT TUB FLOATER WITH OUTWARDLY EXTENDING BRISTLES

(71) Applicant: John McMurphy, Otis, CO (US)

(72) Inventor: John McMurphy, Otis, CO (US)

(*) Notice: Subject to any disclaimer, the term of this patent is extended or adjusted under 35 U.S.C. 154(b) by 0 days. days.

(21) Appl. No.: 15/193,646

(22) Filed: Jun. 27, 2016

(65) Prior Publication Data

US 2016/0376801 A1 Dec. 29, 2016

Related U.S. Application Data

(60) Provisional application No. 62/185,993, filed on Jun. 29, 2015.

(51) Int. Cl.
| | | |
|---|---|---|
| *E04H 4/12* | (2006.01) | |
| *C02F 1/76* | (2006.01) | |
| *B08B 1/00* | (2006.01) | |
| *A46B 11/00* | (2006.01) | |
| *C02F 103/42* | (2006.01) | |

(52) U.S. Cl.
CPC .......... *E04H 4/1281* (2013.01); *A46B 11/001* (2013.01); *B08B 1/002* (2013.01); *C02F 1/76* (2013.01); *A46B 2200/1006* (2013.01); *C02F 2103/42* (2013.01); *C02F 2201/008* (2013.01); *C02F 2303/04* (2013.01); *C02F 2305/02* (2013.01)

(58) Field of Classification Search
CPC ...... E04H 4/1281; C02F 1/76; C02F 2103/42; C02F 2305/02; C02F 2201/008; C02F 2303/04; B08B 1/002; A46B 11/001; A46B 2200/1006; B01D 11/02
USPC ..... 210/167.1, 167.11, 242.1, 205, 749, 753, 210/754, 756
See application file for complete search history.

(56) References Cited

U.S. PATENT DOCUMENTS

| | | | |
|---|---|---|---|
| 4,271,566 A | 6/1981 | Perina | |
| 4,429,429 A * | 2/1984 | Altschul | ............... E04H 4/1654 134/167 R |
| 7,725,971 B2 * | 6/2010 | Harmer | ................... B08B 9/087 119/264 |
| 8,007,664 B2 | 8/2011 | Reed et al. | |
| 2007/0277288 A1 * | 12/2007 | Sing | ......................... A46B 5/04 2/159 |
| 2010/0154822 A1 * | 6/2010 | Reed, Jr. | ................. A47L 13/12 134/6 |

* cited by examiner

*Primary Examiner* — Fred Prince
(74) *Attorney, Agent, or Firm* — Sheridan Ross PC

(57) ABSTRACT

Devices and methods for sanitizing hot tubs and the like are provided. The devices and methods generally incorporate a hot tub floater which releases a sanitizing agent into the water contained in the hot tub. The hot tub floater has bristles on an outer surface. The devices and methods provided have the advantages of being as convenient, inexpensive, and simple as current hot tub floaters, but do not cause unnecessary noise or damage, and can aid in protecting the hot tub against non-biological contaminants.

19 Claims, 2 Drawing Sheets

HOT TUB FLOATER WITH OUTWARDLY EXTENDING BRISTLES

CROSS REFERENCE TO RELATED APPLICATIONS

The present application claims the benefit of U.S. Provisional Application Ser. No. 62/185,993, filed on Jun. 29, 2015. The entirety of which is incorporated by reference herein.

FIELD OF THE INVENTION

Embodiments of the present invention are generally related to hot tub floaters, and particularly to hot tub floaters that clean a hot tub but damage the hot tub or cause noise.

DESCRIPTION OF THE RELATED ART

Hot tubs must be continually sanitized to be safe for human use. Because of their high water temperatures, and because the water in the hot tub is not drained after each use, hot tubs may, without appropriate sanitation, become ideal breeding grounds for pathogens. By way of non-limiting example, bacteria that cause Legionnaires' disease can thrive in the conditions present in a hot tub, and outbreaks of Legionnaires' disease have been directly attributed to poorly sanitized hot tubs.

One of the most common methods of sanitizing hot tubs, as well as swimming pools and the like, is to introduce an effective amount of a halogen-based oxidizer, usually containing chlorine or bromine, into the water. Halogens such as chlorine and bromine sanitize the water in a hot tub quickly, remain chemically stable and effective in the water for long times, and are effective against algae as well as bacteria.

Halogen-based hot tub sanitizing agents are often delivered into hot tub water by a device known as a "floater," which is usually a small device made of hard plastic that houses sanitizing agent tablets. The floater also has a permeable surface or a port for allowing water into the housing, whereby the sanitizing agent is dissolved and dispensed into the hot tub. Floaters can be left to float in the hot tub to sanitize the tub before, during, or after use of the hot tub, and thus constitute simple and inexpensive sanitizing devices. Examples of hot tub floaters are disclosed in U.S. Pat. No. 8,007,664 to Reed et al., which is incorporated by reference in its entirety.

Current hot tub floaters possess several drawbacks, most of which are related to the hard plastic materials of their construction. When the floater floats to the hot tub edge, the floater may bump up against the wall of the hot tub, causing annoying or disturbing noises. Wall collisions can also damage both the hot tub and the floater, perhaps reducing the useful lifespan of each. In addition, most floaters are not capable of protecting the water or walls of the hot tub against non-biological contaminants, including but not limited to dirt, debris, sweat, cosmetics, and suntan lotion, which may accumulate in the water. These non-biological contaminants may build up on the walls of the hot tub, as may limescale from hard water and other undesirable materials.

There is thus a need in the art for devices and methods for sanitizing hot tubs and the like, which have the advantages of being as convenient, inexpensive, and simple as current hot tub floaters, but which do not cause unnecessary noise or damage, and which can aid in protecting the hot tub against non-biological contaminants.

BRIEF SUMMARY OF THE INVENTION

It is one aspect of some embodiments of the present invention to provide a floater for a hot tub, comprising a buoyant member, floating on a surface of water contained in the hot tub; a dispensing member having a cargo chamber, adapted to receive a sanitizing agent, and at least one of a port and a permeable surface, in fluid communication with the cargo chamber; and a plurality of outwardly extending bristles, interconnected to at least a portion of an outer surface of at least one of the buoyant member and the dispensing member.

In some embodiments, the plurality of outwardly extending bristles is, or is structurally identical to, a hook component of a hook-and-loop fastener. In an embodiment, each outwardly extending bristle has a length of between about 0.5 inches and 0.75 inches.

In some embodiments, the floater may further comprise an adhesive member, comprising an adhesive backing having a first surface and a second surface, the first surface containing a waterproof adhesive and being adapted to adhere to an outer surface of the hot tub floater, wherein the plurality of outwardly extending bristles is affixed to the second surface of the adhesive backing. In an embodiment, the adhesive member has a width of between about 0.5 inches and about 1 inch. In another embodiment, the adhesive member has a length of about 15 inches.

It is another aspect of embodiments of the present invention to provide a device for use with a hot tub floater, comprising an adhesive backing having a first surface and a second surface, the first surface containing a waterproof adhesive and being adapted to adhere to an outer surface of the hot tub floater; and a plurality of bristles, affixed to the second surface of the adhesive backing.

In some embodiments, the device is, or is structurally identical to, a hook component of a hook-and-loop fastener. In an embodiment, each bristle has a length of between about 0.5 inches and 0.75 inches. In another embodiment, the device has a width of between about 0.5 inches and about 1 inch. In another embodiment, the device has a length of about 15 inches.

It is yet another aspect of some embodiments of the present invention to provide a method of sanitizing a hot tub with minimal noise and damage to the hot tub, comprising providing a floater, the floater comprising a buoyant member, floating on a surface of water contained in the hot tub, and a dispensing member having a cargo chamber, adapted to receive a sanitizing agent, and at least one of a port and a permeable surface, in fluid communication with the cargo chamber; providing a bristle device, comprising an adhesive backing having a first surface and a second surface, the first surface containing a waterproof adhesive and being adapted to adhere to an outer surface of the hot tub floater, and a plurality of bristles, affixed to the second surface of the adhesive backing; adhering the first surface of the bristle device to the outer surface of the hot tub floater; placing a sanitizing agent in the cargo chamber of the floater; and placing the floater in the hot tub.

In embodiments, the bristle device is, or is structurally identical to, a hook component of a hook-and-loop fastener. In an embodiment, each bristle has a length of between about 0.5 inches and 0.75 inches. In another embodiment, the bristle device has a width of between about 0.5 inches and about 1 inch. In another embodiment, the bristle device has a length of about 15 inches.

These and other advantages will be apparent from the disclosure contained herein.

As used herein, "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

It is to be noted that the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The embodiments and configurations described herein are neither complete nor exhaustive. As will be appreciated, other embodiments of the invention are possible utilizing, alone or in combination, one or more of the features set forth above or described in detail below.

DETAILED DESCRIPTION OF THE INVENTION

Figure 1:
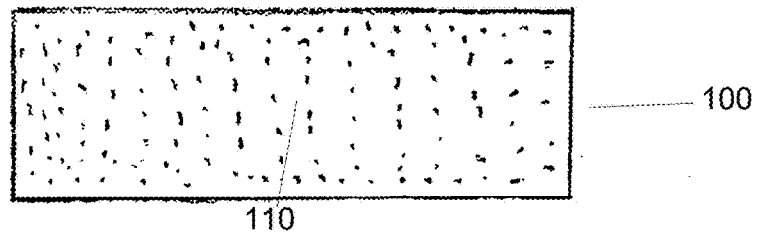
FIG. 1 is a top view of a bristle device, according to embodiments of the present invention.

Referring now to FIG. 1, a bristle device 100 comprising a plurality of bristles 110 is illustrated. In this embodiment, the plurality of bristles 110 is structurally identical to a hook component of a hook-and-loop fastener, including but not limited to those disclosed by U.S. Pat. No. 4,271,566 to Perina, which is incorporated by reference in its entirety. Furthermore, in this embodiment, the plurality of bristles 110 has a width of between about 0.5 inches and about 1 inch, and a length of about 15 inches. These dimensions allow the plurality of bristles 110 to be interconnected to an outer surface of a hot tub floater. The plurality of bristles 110 softens the impact of the hot tub floater against the side walls of a hot tub, thus minimizing the noise and damage caused by the collision and helping to keep the side walls free of contaminants.

Figure 2:
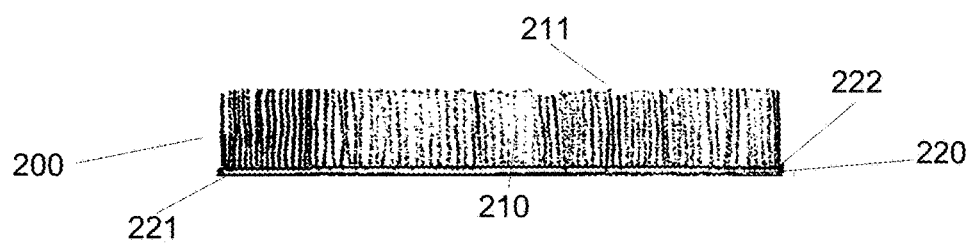
FIG. 2 is a side view of a bristle device, according to embodiments of the present invention.

Referring now to FIG. 2, a bristle device 200 comprising a plurality of bristles 210 is illustrated. In this embodiment, the plurality of bristles 210 is structurally identical to a hook component of a hook-and-loop fastener. Furthermore, in this embodiment, each bristle 211 has a length of between about 0.5 inches and about 0.75 inches. The bristle device 200 further comprises an adhesive member 220, with a waterproof adhesive disposed on one surface 221 of the adhesive member 220 and the plurality of bristles 210 disposed on an opposing surface 222 of the adhesive member 220. The waterproof adhesive enables the bristle device 200 to be adhered to an outer surface of a hot tub floater. The plurality of bristles 210 softens the impact of the hot tub floater against the side walls of a hot tub, thus minimizing the noise and damage caused by the collision and helping to keep the side walls free of contaminants.

Figure 3:
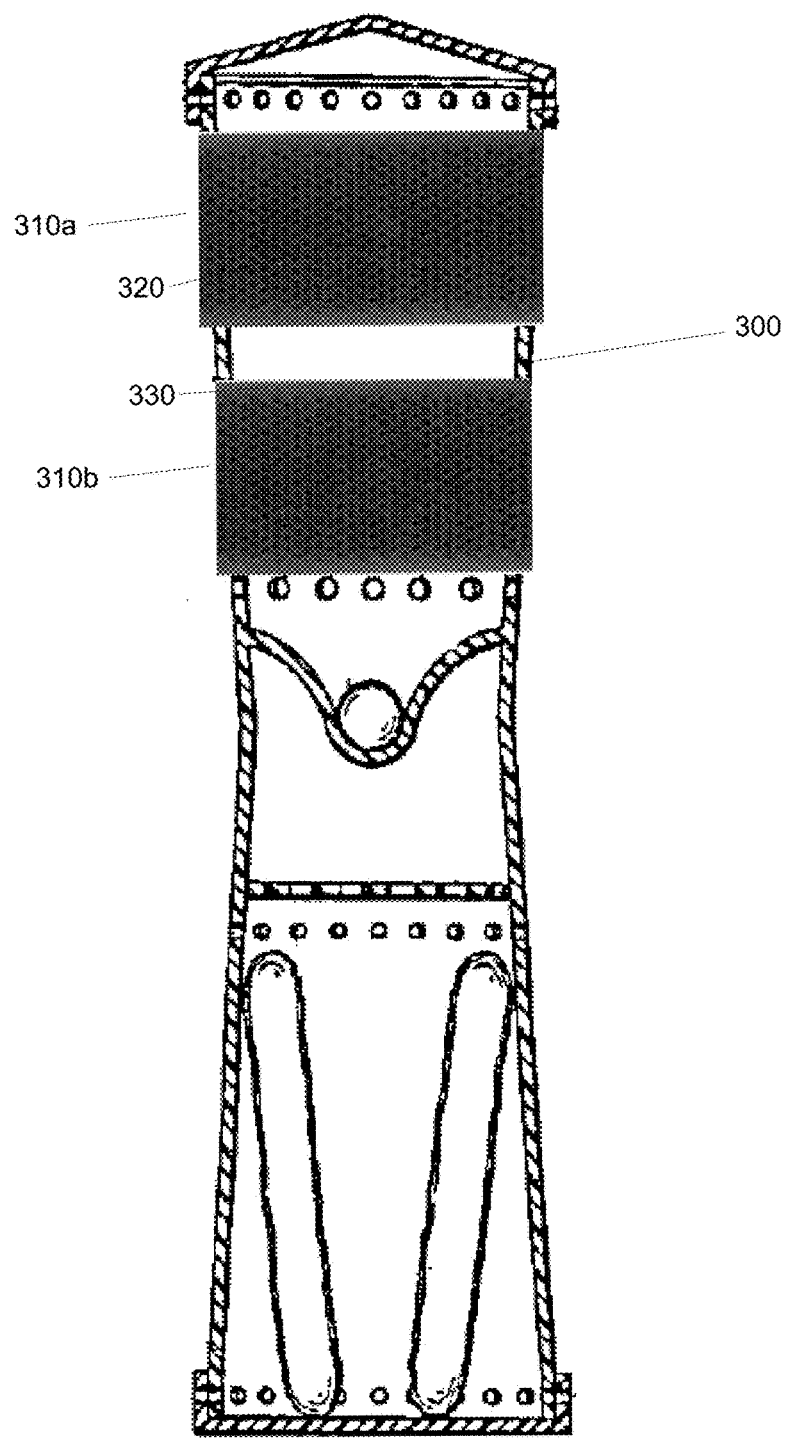
FIG. 3 is a side view of a hot tub floater equipped with two bristle devices, according to embodiments of the present invention.

Referring now to FIG. 3, a hot tub floater 300 equipped with two bristle devices 310a,b, each bristle device 310 comprising a plurality of bristles 320, is illustrated. In this embodiment, each plurality of bristles 320 is structurally identical to a hook component of a hook-and-loop fastener. Furthermore, in this embodiment, each plurality of bristles 320 has a width of between about 0.5 inches and about 1 inch, and each bristle has a length of between about 0.5 inches and about 0.75 inches. These dimensions allow the plurality of bristles 320 to encircle at least a portion of a diameter of the hot tub floater 300, without interfering with delivery of a sanitizing agent contained within the hot tub floater 300. Each bristle device 310 further comprises an adhesive member 330, with a waterproof adhesive disposed on one surface of the adhesive member and the plurality of bristles 320 disposed on an opposing surface of the adhesive member. The waterproof adhesive enables the bristle device 310 to be adhered to an outer surface of the hot tub floater. The plurality of bristles 320 softens the impact of the hot tub floater against the side walls of a hot tub, thus minimizing the noise and damage caused by the collision and helping to keep the side walls free of contaminants.

In embodiments, bristle devices 310a,b may be selectively interconnected to the hot tub floater, enabling a user to remove and reattach the bristle device 310a,b. This selective interconnection permits bristle devices to be easily replaced if and when they become worn.

The invention illustratively disclosed herein suitably may be practiced in the absence of any element which is not specifically disclosed herein. It is apparent to those skilled in the art, however, that many changes, variations, modifications, other uses, and applications of the invention are possible, and also changes, variations, modifications, other uses, and applications which do not depart from the spirit and scope of the invention are deemed to be covered by the invention, which is limited only by the claims which follow.

The foregoing discussion of the invention has been presented for purposes of illustration and description. The foregoing is not intended to limit the invention to the form or forms disclosed herein. In the foregoing Detailed Description of the Invention, for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of the Invention, with each claim standing on its own as a separate preferred embodiment of the invention.

Moreover, though the description of the invention has included description of one or more embodiments and certain variations and modifications, other variations, combinations, and modifications are within the scope of the invention, e.g. as may be within the skill and knowledge of those in the art, after understanding the present disclosure. It is intended to obtain rights which include alternative embodiments to the extent permitted, including alternate, interchangeable, and/or equivalent structures, functions, ranges, or steps to those claimed, whether or not such alternate, interchangeable, and/or equivalent structures, functions, ranges, or steps are disclosed herein, and without intending to publicly dedicate any patentable subject matter.

What is claimed is:

1. A floating cleaning device for a hot tub, comprising:
   a buoyant member, adapted to float on a surface of water contained in the hot tub;
   a dispensing member having a cargo chamber, adapted to receive a sanitizing agent, and at least one of a port and a permeable surface, in fluid communication with the cargo chamber;
   a plurality of outwardly extending bristles, interconnected to at least a portion of an outer surface of at least one of the buoyant member and the dispensing member, wherein the plurality of outwardly extending bristles is configured to contact a surface of the hot tub to systematically clean any debris from the surface of the hot tub, and
   an adhesive member having a first surface and a second surface, the first surface containing a waterproof adhesive and being adapted to adhere to an outer surface of the hot tub floater, wherein the plurality of outwardly extending bristles is affixed to the second surface.

2. The floater of claim 1, wherein the plurality of outwardly extending bristles are generally shaped like a hook component of a hook-and-loop fastener.

3. The floater of claim 2, wherein each outwardly extending bristle has a length of between about 0.5 inches and 0.75 inches.

4. The floater of claim 1, wherein the adhesive member has a width of between about 0.5 inches and about 1 inch.

5. The floater of claim 1, wherein the adhesive member has a length of about 15 inches.

6. The floater of claim 1, wherein the plurality of outwardly extending bristles are positioned below a top surface of the buoyant member.

7. The floater of claim 6, further comprises a second plurality of outwardly extending bristles interconnected to at least a portion of an outer surface of at least one of the buoyant member and the dispensing member between the other plurality of outwardly extending bristles and a bottom surface of the dispensing member.

8. A floating, cleaning device for automatically cleaning a hot tub surface, comprising:
   a floater member adapted to float on a surface of water contained in a hot tub, the floater member having an upper end, a lower end, and an outer surface disposed between said upper end and said lower end;
   a first adhesive member having a first surface and a second surface, the first surface containing a waterproof adhesive and being adhered to said outer surface of the floater member below the upper end, the first adhesive member having
   a plurality of bristles affixed to the second surface of the first adhesive member;
   a second adhesive member having a first surface and a second surface, the first surface containing a waterproof adhesive and being adhered to said outer surface of the floater member between the first adhesive member and the lower end, the second adhesive member having a plurality of bristles affixed to the second surface of the second adhesive member.

9. The device of claim 8, wherein the plurality of bristles of the first adhesive member is generally shaped like a hook component of a hook-and-loop fastener.

10. The device of claim 9, wherein each bristle has a length of between about 0.5 inches and 0.75 inches.

11. The device of claim 9, having a width of between about 0.5 inches and about 1 inch.

12. The device of claim 9, having a length of about 15 inches.

13. A method of cleaning a hot tub and conditioning the water in the hot tub, comprising:
   providing a floater comprising a buoyant member, adapted to float on a surface of water contained in the hot tub, and a dispensing member, the dispensing member having a cargo chamber, adapted to receive a sanitizing agent, and at least one of a port and a permeable surface, in fluid communication with the cargo chamber;
   providing a bristle device, comprising an adhesive member having a first surface and a second surface, the first surface containing a waterproof adhesive and being adapted to adhere to an outer surface of the floater, and a plurality of bristles, affixed to the second surface of the adhesive member, and wherein the plurality of bristles are configured to contact a surface of the hot tub to dislodge debris;
   adhering the first surface of the bristle device to the outer surface of the hot tub floater;
   placing a sanitizing agent in the cargo chamber of the floater; and
   placing the floater in the hot tub.

14. The method of claim 13, wherein the bristle device is, or is structurally identical to, a hook component of a hook-and-loop fastener.

15. The method of claim 14, wherein each bristle has a length of between about 0.5 inches and 0.75 inches.

16. The method of claim 14, wherein the bristle device has a width of between about 0.5 inches and about 1 inch.

17. The method of claim 14, wherein the bristle device has a length of about 15 inches.

18. The method of claim 13, wherein the first surface of the bristle device is adhered below a top surface of the hot tub floater.

19. The method of claim 18, further comprising:
   adhering a second bristle device to the outer surface of the hot tub floater between the other bristle device and a bottom surface of the hot tub floater.

* * * * *